US009585018B2

(12) United States Patent
Piscopo, Jr. et al.

(10) Patent No.: US 9,585,018 B2
(45) Date of Patent: Feb. 28, 2017

(54) TRANSIT NETWORK COMMUNICATION ROUTING

(71) Applicant: T-Mobile USA, Inc., Bellevue, WA (US)

(72) Inventors: Robert F. Piscopo, Jr., Bellevue, WA (US); Mehul Shah, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 272 days.

(21) Appl. No.: 14/335,454

(22) Filed: Jul. 18, 2014

(65) Prior Publication Data

US 2016/0021539 A1 Jan. 21, 2016

(51) Int. Cl.
| | |
|---|---|
| *H04M 1/66* | (2006.01) |
| *H04W 12/08* | (2009.01) |
| *H04W 40/00* | (2009.01) |
| *H04W 88/16* | (2009.01) |
| *H04W 48/18* | (2009.01) |

(52) U.S. Cl.
CPC .............. *H04W 12/08* (2013.01); *H04W 40/00* (2013.01); *H04W 88/16* (2013.01); *H04W 48/18* (2013.01)

(58) Field of Classification Search
CPC ...... H04W 12/08; H04W 40/00; H04W 88/16; H04W 48/00; H04W 48/18
USPC ..... 455/410, 411, 433, 435.1; 370/351, 392, 370/395.31
See application file for complete search history.

(56) References Cited

U.S. PATENT DOCUMENTS

| | | | |
|---|---|---|---|
| 2009/0082019 A1 | 3/2009 | Marsico | |
| 2009/0141671 A1 | 6/2009 | Miyagi et al. | |
| 2010/0075669 A1 | 3/2010 | Sparks et al. | |
| 2012/0063582 A1* | 3/2012 | Naqvi | H04L 65/1006 379/201.04 |
| 2012/0317261 A1 | 12/2012 | Ahmavaara | |
| 2013/0195264 A1 | 8/2013 | Kirchhoff et al. | |
| 2016/0066175 A1* | 3/2016 | Wang | H04W 8/02 455/432.1 |

OTHER PUBLICATIONS

PCT Search Report and Written Opinion mailed Oct. 19, 2015 for PCT Application No. PCT/US15/39613.

* cited by examiner

*Primary Examiner* — Wayne Cai
(74) *Attorney, Agent, or Firm* — Lee & Hayes, PLLC

(57) ABSTRACT

This disclosure is directed at least partly to routing calls and/or other communications from a Mobile Virtual Network Operator (MVNO) that uses a Mobile Network Operator (MNO) as a transit network. The MVNOs may desire to use the MNO's network as a transit network to complete or terminate calls from users who may be roaming and/or are on other access networks such as Wi-Fi. The MNO may implement logic to determine whether to allow the MNO's network to be used as a transit network based at least in part on conditions such as one or more of agreements with an MVNO, business considerations, and/or other considerations (e.g., network bandwidth, etc.). The logic may enforce the rules by selectively allowing some communications and denying other communications.

20 Claims, 7 Drawing Sheets

TRANSIT NETWORK COMMUNICATION ROUTING

BACKGROUND

Mobile Virtual Network Operators (MVNOs) are entities that provide data and/or voice services to customers by leveraging other networks as transit networks to provide these services. MVNOs typically do not own or operate their own network infrastructure. Instead, MVNOs connect users to other parties and provide services through existing incumbent network operators that can provide radio, voice and data via a transit network for use by the MVNOs. A transit network may be any type of network that is leveraged by a MVNO for a purpose of providing a service by the MVNO. Some MVNOs offer services such as Voice over Internet Protocol (VoIP), which allow users to make and/or receive voice calls using data networks. MVNOs may provide messaging services, which may provide text messages, video messages, and/or audio messages. Users access services from the MVNOs using personal devices such as smartphones, tablets, notebook computers, and/or other communication devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure is directed at least partly to routing calls and/or other communications from a Mobile Virtual Network Operator (MVNO) that uses a Mobile Network Operator (MNO) as a transit network. Some MVNOs may enter agreements with MNOs or otherwise integrate communication services with an MNO's switching and routing network to enable offering wireless services. The MVNOs may desire to use the MNO's network as a transit network to complete or terminate calls from users who may be roaming and/or are on other access networks such as Wi-Fi. Although this discussion focuses on calls (e.g., VoIP calls, etc.), other types of communications may be facilitated using this infrastructure, such as distribution of text messages, multimedia messages, video messages, and/or other audio, imagery, or text.

The MNO may implement logic to determine whether to allow the MNO's network to be used as a transit network based at least in part on one or more of agreements with an MVNO, business considerations, and/or other considerations (e.g., network bandwidth, etc.). For example, the MNO may desire to protect its network from being used as a transit network due to the cost of call termination, capacity impacts to the core network elements, and/or intricacies of usage settlement via call-detail record (CDR) reconciliation. The disclosure below sets forth network architecture and techniques that allow an MNO to limit its network from being uses as a transit network.

The techniques and systems described herein may be implemented in a number of ways. Example implementations are provided below with reference to the following figures.

Example Environment

Figure 1:
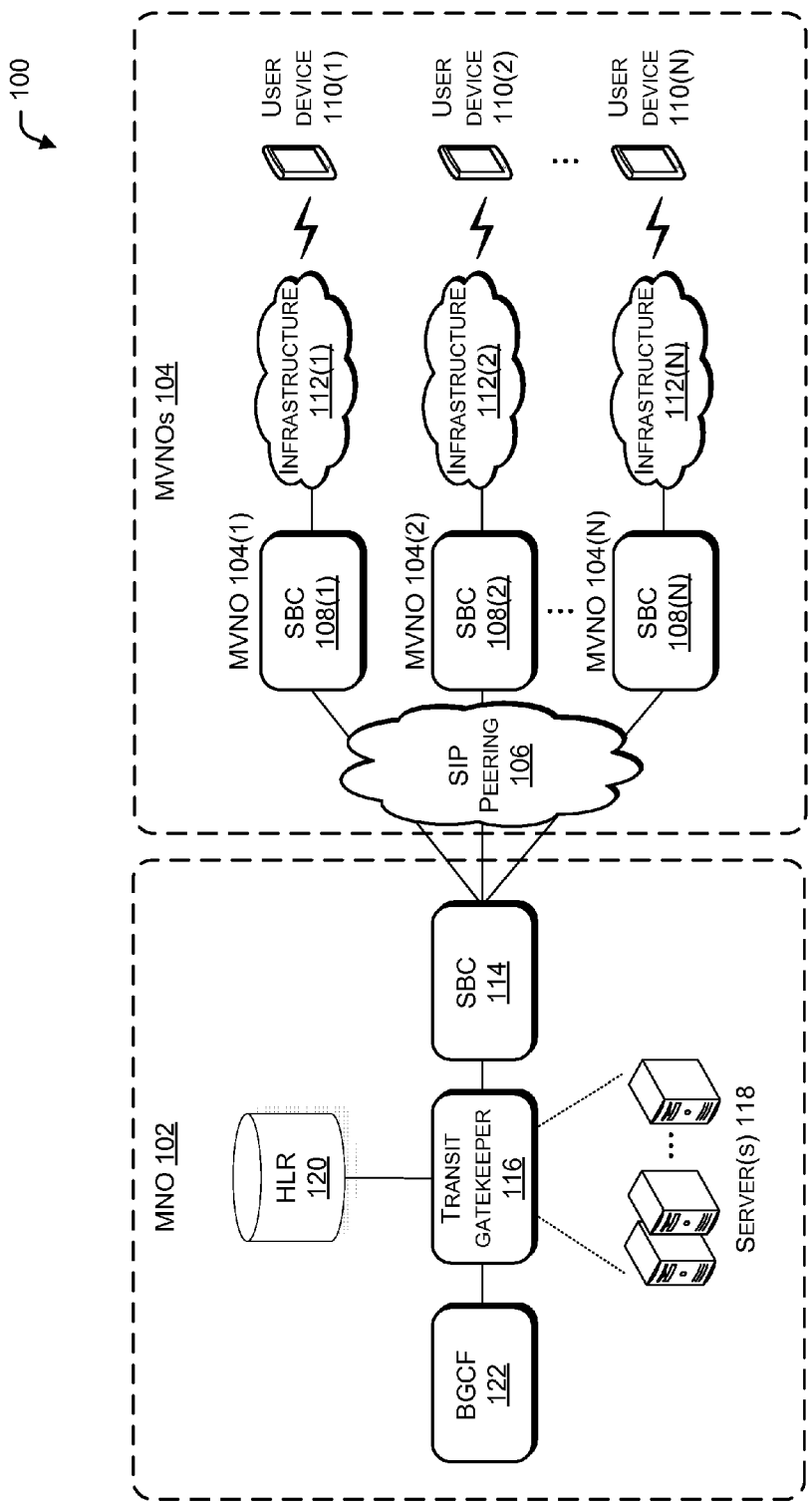
FIG. 1 illustrates an example environment that includes a mobile network operator's (MNO) network that may be selectively used by a MVNO as a transit network.

FIG. 1 illustrates an example environment 100 that includes a MNO's network 102 that may be selectively used by one or more of a plurality of MVNOs 104 as a transit network. Although the MVNOs 104 may use the MNO 102 to process different types of communications, the discussion below focuses on VoIP calls for discussion purposes. Thus, the concepts below may be used to facilitate processing of other types of communications and is not limited to VoIP calls.

The MNO 102 may peer with one or more of the MVNOs 104 using a session initiation protocol (SIP) peering link 106. Each MVNO 104(1), 104(2), . . . , 104(N) may have its own SIP peering connection. The SIP peering may be performed using an Interconnect Session Border Controller (I-SBC), an Interconnect Border Control Function (I-BCF), or other available controllers or functions. Each MVNO 104(1), 104(2), . . . , 104(N) may be associated with a unique identifier (ID) which identifies the source of the SIP traffic coming into the network of the MNO 102. In some embodiments, the MVNOs 104 may be identified by associating each MVNO with unique session agents on respective session border controllers (SBCs) 108(1), 108(2), . . . , 108(N), which communicate with an SBC 114 of the MNO 102.

As inputs, the MVNOs 104(1)-(N) may each include at least one respective user device 110(1)-(N), which provides information to the respective SBC 108(1)-(N) through respective infrastructure 112(1)-(N).

A transit gatekeeper 116, which may be operated by one or more servers 118, may implement transit logic to determine how to route a requested communication. The transit gatekeeper 116 may receive incoming SIP traffic from the SBC 114, which was received via one of the SBCs 108. The transit gatekeeper 116 may determine whether to allow or deny transit routing from an originating MVNO of the MVNOs 104.

The transit gatekeeper 116 may access a Home Location Register (HLR) 120, which matches mobile subscriber information for a wireless carrier's network to one or more of matching phones, phone numbers, user accounts, and/or service plan information. In some embodiments, the HLR 120 may be implemented as a Home Subscriber Server (HSS) in Long-Term Evolution (LTE) networks. The HLR 120 may store an internal lookup table that includes conditions to determine whether or how transit routing logic is to be invoked for specific MVNO partners. An example of such a lookup table is as shown below in Table 1.

TABLE 1

| MVNO | Condition A Transit Routing Allowed? | Condition B Roaming Exception? | Condition C International Calls allowed? | Condition D Wi-Fi Calls from Outside US to any destination? | Condition E Wi-Fi Calls from the US to any destination? |
|---|---|---|---|---|---|
| MVNO 1 | Yes | Yes | No | No | Yes |
| MVNO 2 | No | N/A | N/A | N/A | N/A |
| MVNO 3 | Yes | Yes | Yes | Yes | No |
| MVNO N | Yes | Yes | No | Yes | Yes |

Table 1 includes multiple example MVNOs 104 and corresponding rules for example conditions A-E. However, more or fewer conditions/rules may be used, as well as different conditions/rules that allow or deny MVNOs from using the MNO network as a transit network as discussed herein. The example conditions/rules are discussed in further detail below with reference to FIGS. 5 and 6.

When a call or communication is allowed by the transit gatekeeper 116, the transit gatekeeper may use a Breakout Gateway Control Function (BGCF) 122 to determine how an incoming call or communication should be routed based on subscriber identifiers. Subscription identifiers may include Mobile Subscriber Integrated Services Digital Network-Numbers (MSISDNs), which are numbers that uniquely a subscriber in a mobile network. In some embodiments, processes may be implemented at least partly on a generic SIP server that also implements interfaces to the BGCF 122 and the HLR 120.

Example Transit Gatekeeper

Figure 2:
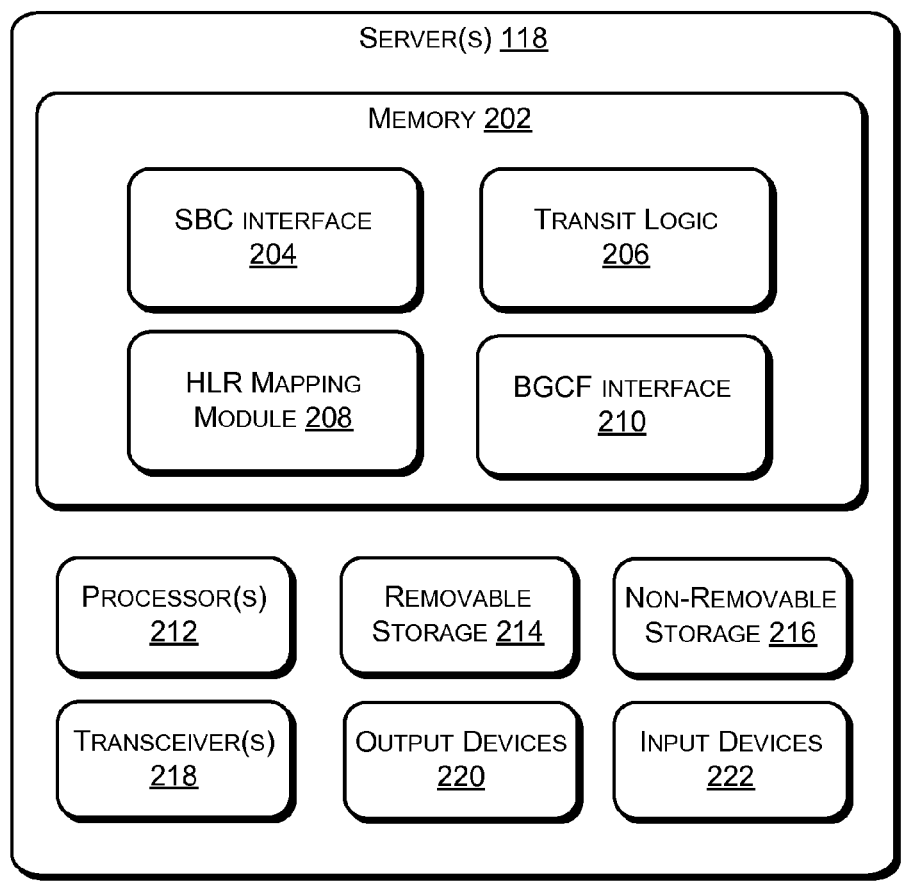
FIG. 2 illustrates a component level view of the server(s) of the MNO shown in FIG. 1.

FIG. 2 illustrates a component level view of the servers 118 of the MNO 102 shown in FIG. 1. As illustrated, the servers 118 comprise system memory 202, which may store an SBC interface 204, transit logic 206, an HLR mapping module 208, and a BGCF interface 210. The servers 118 may include one or more processor(s) 212, a removable storage 214, a non-removable storage 216, transceiver(s) 218, output device(s) 220, and input device(s) 222.

In various embodiments, system memory 202 is volatile (such as RAM), non-volatile (such as ROM, flash memory, etc.) or some combination thereof.

The SBC interface 204 may receive the incoming SIP traffic from the SBC 114. In some embodiments, the incoming traffic may include the unique ID which identifies the source of the SIP traffic coming into the network of the MNO 102.

The transit logic 206 may access, store, and implement rules/conditions to determine whether to allow or deny a requested communication and/or how to route a requested communication. The transit logic 206 may access the HLR 120 using the HLR mapping module 208 to access mobile subscriber information. The transit logic 206 may then pass communications and calls to the BGCF interface 210 for routing when the calls/communications are to be routed or further processed. The transit logic 206 may stop, terminate, discontinue and/or otherwise reject calls/communications that are determined to not be allowed to use the MNO 102 as a transit network, based on various rules/conditions implemented by the transit logic.

In some embodiments, the processor(s) 410 is a central processing unit (CPU), a graphics processing unit (GPU), or both CPU and GPU, or any other sort of processing unit.

The servers 118 may also include additional data storage devices (removable and/or non-removable) such as, for example, magnetic disks, optical disks, or tape. Such additional storage is illustrated in FIG. 2 by removable storage 214 and non-removable storage 216. Tangible computer-readable media may include volatile and nonvolatile, removable and non-removable media implemented in any method or technology for storage of information, such as computer readable instructions, data structures, program modules, or other data. System memory 202, removable storage 214 and non-removable storage 216 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by servers 118. Any such tangible computer-readable media may be part of the servers 118.

In some embodiments, the transceivers 218 include any sort of transceivers known in the art. For example, transceivers 218 may include a radio transceiver that performs the function of transmitting and receiving radio frequency communications. Also, or instead, the transceivers 218 may include other wireless or wired connectors, such as Ethernet connectors or near field antennas. The transceivers 218 may facilitate connectivity by one or more devices, such as the devices 110, to a public network, such as MNO 102. Thus, the transceivers 218 may enable communications with and/or between the SBC interface 204, the transit logic 206, the HLR mapping module 208, and/or the BGCF interface 210.

The output devices 220 include any sort of output devices known in the art, such as a display. The input devices 222 include any sort of input devices known in the art. For example, input devices 222 may include a keyboard/keypad and/or a touch-sensitive display (such as the touch-sensitive display screen described above).

Example Telecommunication Device

Figure 3:
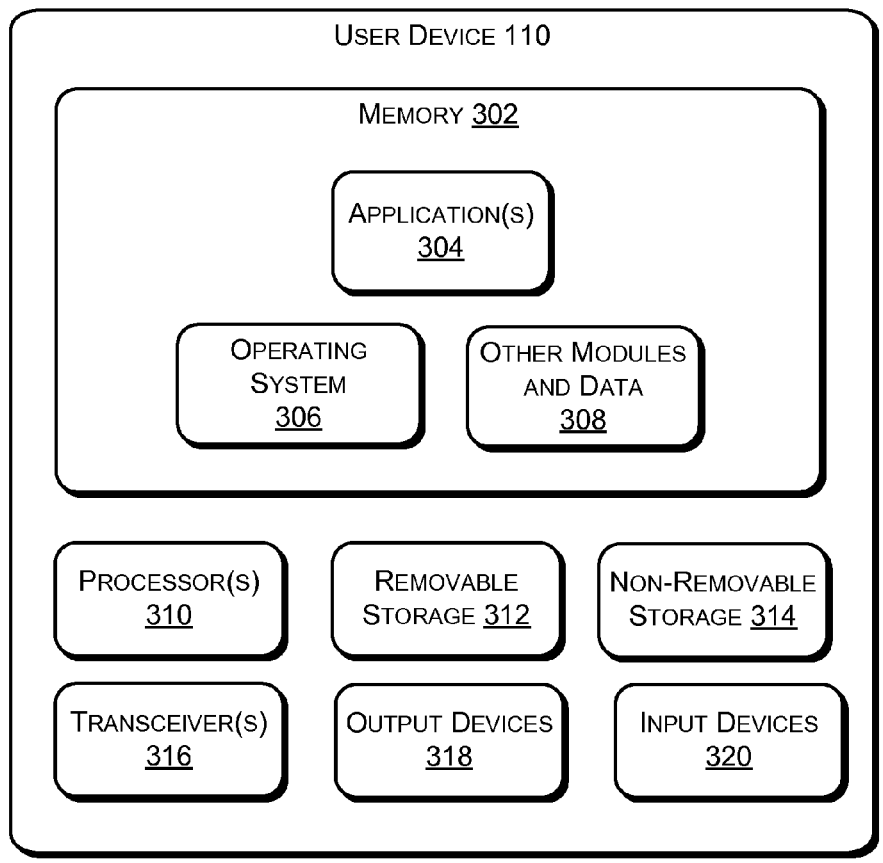
FIG. 3 illustrates a component level view of an example user device shown in FIG. 1.

FIG. 3 illustrates a component level view of an example user device (e.g., the user device 110) shown in FIG. 1. The user device may be any sort of telecommunications device capable of cellular or wireless network communication, such as a mobile or cellular phone, a tablet computer, a personal digital assistant (PDA), a personal computer (PC), a laptop computer, a media center, a work station, etc.

As illustrated, the user device 110 comprises a system memory 302 storing one or more applications 304, an operating system 306, and other modules and data 308. Also, the user device 110 includes processor(s) 310, a removable storage 312, a non-removable storage 314, transceiver(s) 316, output device(s) 318, and input device(s) 320.

In various embodiments, system memory 302 is volatile (such as RAM), non-volatile (such as ROM, flash memory, etc.) or some combination thereof. The applications 304 may include software that facilitates communication via the MVNO 104 that causes access to the MNO 102. For example, the applications 204 may include a VoIP application that is accessed from a remote location (e.g., cloud based), stored locally on the user device, or a combination of both. The operating system 306 may enable access to software, maintain device operation, and perform other typical operating system functions. The other modules or data 308 stored in the system memory 302 may comprise any sort of applications or platform components of the user device 110, as well as data associated with such applications or platform components.

In some embodiments, the processor(s) 310 is a central processing unit (CPU), a graphics processing unit (GPU), or both CPU and GPU, or any other sort of processing unit.

User device 110 also includes additional data storage devices (removable and/or non-removable) such as, for example, magnetic disks, optical disks, or flash memory. Such additional storage is illustrated in FIG. 3 by removable storage 312 and non-removable storage 314. Tangible computer-readable media may include volatile and nonvolatile, removable and non-removable media implemented in any method or technology for storage of information, such as computer readable instructions, data structures, program modules, or other data. System memory 302, removable storage 312 and non-removable storage 314 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the user device 110. Any such tangible computer-readable media may be part of the user device 110.

In some embodiments, the transceiver(s) 316 includes any sort of transceivers and/or radios known in the art, and may be associated with a wireless communication stack. For example, transceiver(s) 316 may include a radio transceiver that performs the function of transmitting and receiving radio frequency communications via an antenna. The transceiver(s) 316 may facilitate wireless connectivity between the user device 110 and various cell towers, base stations and/or access points of a telecommunication network, such as the MNO 102. The transceiver(s) 316 may facilitate wireless connectivity to a Wi-Fi station to enable Wi-Fi connectivity. In some embodiments, the user device 110 may also include a wireless communication transceiver and a near field antenna for communicating over wireless IP networks, such as local wireless data networks and personal area networks (e.g., Bluetooth or near field communication (NFC) networks).

In some embodiments, the output devices 318 include any sort of output devices known in the art, such as a display (e.g., a liquid crystal display), speakers, a vibrating mechanism, or a tactile feedback mechanism. Output devices 318 also include ports for one or more peripheral devices, such as headphones, peripheral speakers, or a peripheral display.

In various embodiments, input devices 320 include any sort of input devices known in the art. For example, input devices 320 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

FIGS. 4-7 are flow diagrams of illustrative processes to route communications through a transit network. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
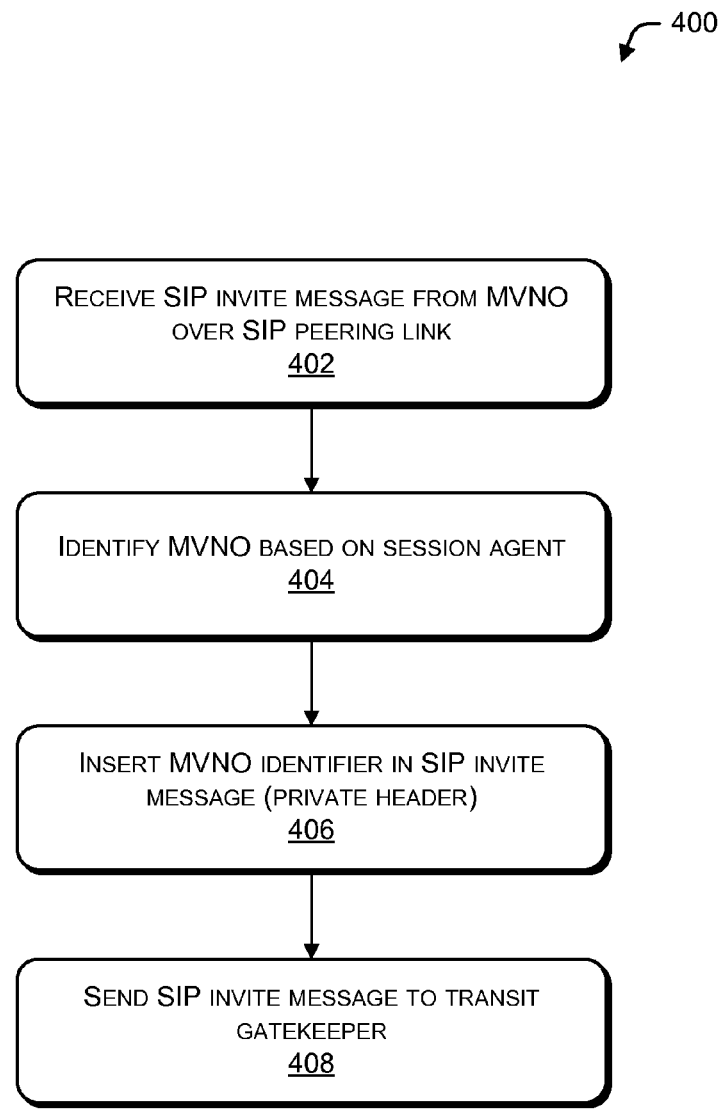
FIG. 4 illustrates an example process of managing session initiation protocol (SIP) peering using a session border controller (SBC).

FIG. 4 illustrates an example process 400 of managing SIP peering using the SBC. The process 400 is described with reference to the environment 100 and may be performed by the SBC 114 via the SBC interface 204. Of course, the process 400 may be performed in other similar and/or different environments.

At 402, the SBC 114 may receive a SIP invite message from one of the MVNOs 104 over the SIP peering link 106. For example, the SBC 108(1) may generate and/or transfer a SIP invite message to the SBC 114 via the SIP peering link 106. The SIP invite message may include an identifier that identifies the respective MVNO, which is the MVNO 104(1) in this example.

At 404, the SBC 114 may identify the MVNO based on a session agent. For example, the SBC 114 may identify the MVNO by associating each MVNO with unique session agents on respective SBCs 108.

At 406, the SBC 114 may insert an MVNO identifier (ID) in the SIP invite message. For example, the SBC 114 may insert the MVNO ID as a private header in the invite message.

At 408, the SBC 114 may send the SIP invite message to the transit gateway 116. The transit gateway 116 may then process the SIP invite message in accordance with a process, such as the process described below with reference to FIG. 5 or 6, or a variation thereof.

Figure 5:
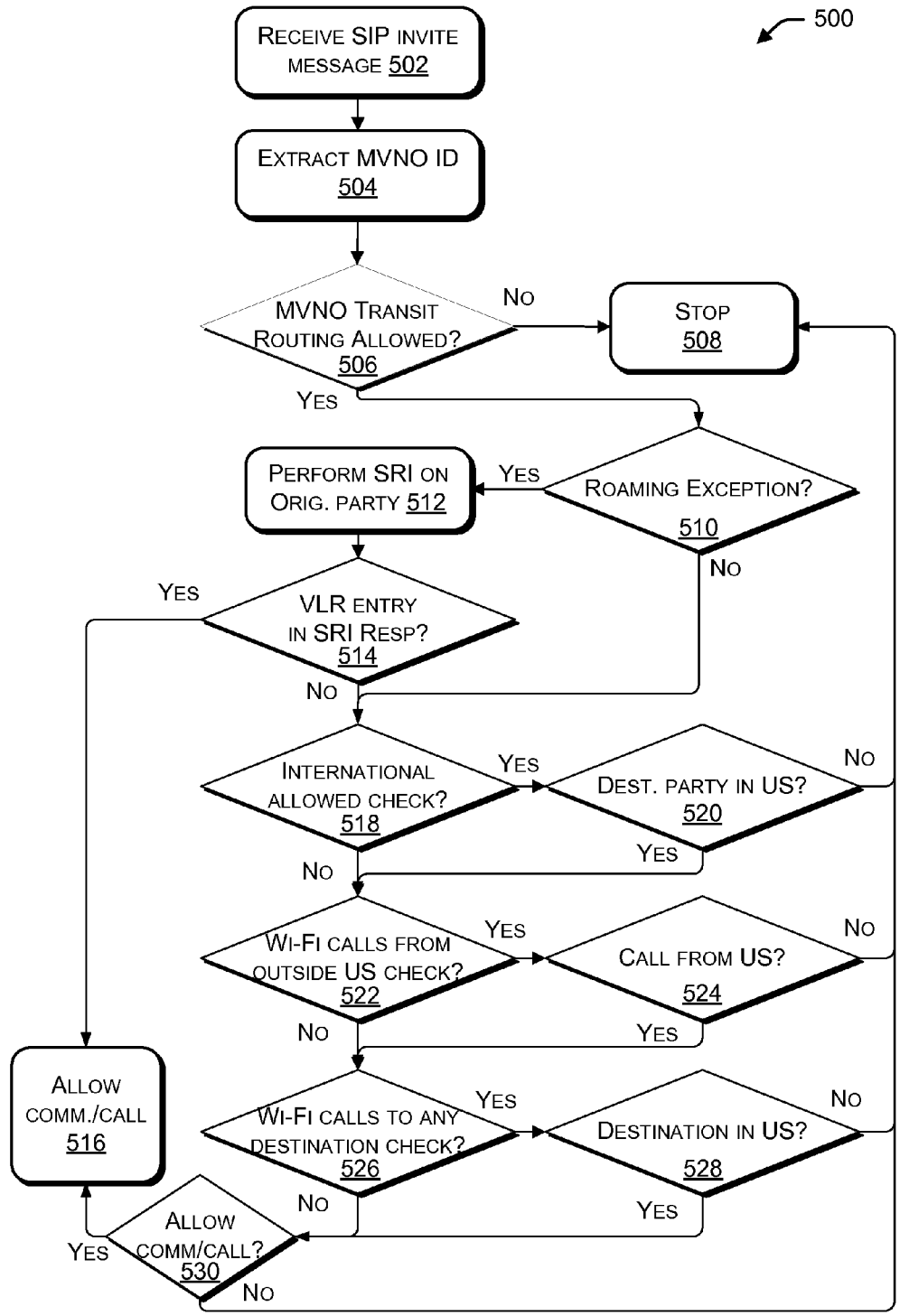
FIG. 5 illustrates an example process of routing traffic that uses a MNO as a transit network.

FIG. 5 illustrates an example process 500 of routing traffic that uses a MNO as a transit network. The process 500 is described with reference to the environment 100 and may be performed by the transit gatekeeper 116 that employs the transit logic 206. Of course, the process 500 may be performed in other similar and/or different environments.

At 502, the transit gatekeeper 116 may receive the SIP invite message from the SBC 114 following the operation 408 discussed above. The SIP invite may include the MVNO ID.

At 504, the transit gatekeeper 116 may extract the MVNO ID. The transit gatekeeper 116 may access a table, such as Table 1, provided above, to lookup conditions/rules associated with the MVNO using the MVNO ID. In some embodiments, the MVNO ID may be determined based on other data, and thus not extracted directly from the SIP invite message.

At 506, the transit gatekeeper 116 may determine, based at least in part on the MVNO ID, whether to allow any transit routing for the identified MVNO. For example, this condition may be based on Condition A shown in Table 1.

When no transit routing is allowed (following the "no" route from the decision operation 506), then the process 500 may advance to an operation 508.

At 508, the MVNO may be denied access to the MNO network for use as a transit network. For example, the MNO may terminate transmission with the MVNO upon or after this determination. In some embodiments, the MNO 102 may transmit a termination message.

When transit routing is allowed (following the "yes" route from the decision operation 506), then the process 500 may advance to a decision operation 510.

At 510, the transit gatekeeper 116 may determine, based at least in part on the MVNO ID, whether to allow a roaming exception for the identified MVNO. For example, this condition may be based on Condition B shown in Table 1. When the roaming exception is allowed (following the "yes" route from the decision operation 510), then the process 500 may advance to an operation 512.

At 512, the transit gatekeeper 116 may perform a send routing information (SRI) request for the originating party (e.g., calling party, party using the respective user device 110) in order to obtain an SRI response.

At 514, the transit gatekeeper 116 may determine whether a visitor location registry (VLR) entry is included in the SRI response. This may indicate that the originating party is a verified roaming user and thus can be allowed to access the MNO network as a transit network. When the VLR entry is included in the SRI response (following the "yes" route from the decision operation 514), then the process 500 may advance to an operation 516.

At 516, the transit gatekeeper 116 may allow the communication/call by the originating party.

When the VLR entry is not included in the SRI response (following the "no" route from the decision operation 514) or when the roaming exception is not allowed (following the "no" route from the decision operation 510), then the process 500 may advance to a decision operation 518.

At 518, the transit gatekeeper 116 may determine, based at least in part on the MVNO ID, whether to perform an international destination check for the identified MVNO. For example, this condition may be based on Condition C shown in Table 1. For example, when Condition C includes "No" in the field associated with an MVNO (e.g., no international calls allowed), then the international allowed check may trigger further inspection as to a destination of the destination party. When the international check is to be performed (following the "yes" route from the decision operation 518), then the process 500 may advance to an operation 520.

At 520, the transit gatekeeper 116 may determine, based at least in part on the MVNO ID, whether the destination party (e.g., called party, etc.) is located in the US (or another specified region). When the destination party is not located in the US (or another specified region) (following the "no" route from the decision operation 520), then the process 500 may advance to the operation 508 and terminate. When the international check is not to be performed (following the "no" route from the decision operation 518) or when the destination party is located in the US (or another specified region) (following the "yes" route from the decision operation 520), then the process 500 may advance to an operation 522.

At 522, the transit gatekeeper 116 may determine, based at least in part on the MVNO ID, whether to perform a Wi-Fi calls (or other calls from unlicensed spectrums) from outside the US (or other region) allowance check for the identified MVNO. For example, this condition may be based on Condition D shown in Table 1. For example, when Condition D includes "No" in the field associated with an MVNO (e.g., no Wi-Fi calls from outside the US to any destination), then the Wi-Fi calls from outside the US check may trigger further inspection as to a location of the originating party. When the Wi-Fi calls from outside the US check is to be performed (following the "yes" route from the decision operation 522), then the process 500 may advance to an operation 524.

At 524, the transit gatekeeper 116 may determine, based at least in part on the MVNO ID, whether the call is from the US (or other specified region). When the originating party is not located in the US (or another specified region) (following the "no" route from the decision operation 524), then the process 500 may advance to the operation 508 and terminate. When the Wi-Fi calls from outside the US check is not to be performed (following the "no" route from the decision operation 522) or when the originating party is located in the US (or another specified region) (following the "yes" route from the decision operation 524), then the process 500 may advance to an operation 526. The originating party may be determined to be in the US based on various connection data (e.g., IP address, etc.), locating information, or other data. Further examples are provided with reference to FIG. 6.

At 526, the transit gatekeeper 116 may determine, based at least in part on the MVNO ID, whether to perform a Wi-Fi calls to any destination check for the identified MVNO. For example, this condition may be based on Condition E shown in Table 1. For example, when Condition E includes "No" in the field associated with an MVNO (e.g., no Wi-Fi calls to any destination), then the Wi-Fi calls to any destination check may trigger further inspection as to a destination of the destination party. When the Wi-Fi calls to any destination check is to be performed (following the "yes" route from the decision operation 526), then the process 500 may advance to an operation 528.

At 528, the transit gatekeeper 116 may determine, based at least in part on the MVNO ID, whether the destination is in the US (or other specified region). When the destination party is not located in the US (or another specified region) (following the "no" route from the decision operation 528), then the process 500 may advance to the operation 508 and terminate. When the Wi-Fi calls to any destination check is not to be performed (following the "no" route from the decision operation 526) or when the destination party is located in the US (or another specified region) (following the "yes" route from the decision operation 528), then the process 500 may advance to a decision operation 530.

At 530, the transit gatekeeper 116 may determine, based at least in part on the MVNO ID, whether to allow the communication/call. When the transit gatekeeper 116 determines to allow the communication/call (following the "yes" route from the decision operation 530), then the process 500 may advance to the operation 516 where the transit gatekeeper 116 may allow the communication/call by the originating party. When the transit gatekeeper 116 determines not to allow the communication/call (following the "no" route from the decision operation 530), then the process 500 may advance to the operation 508 where the transit gatekeeper 116 may deny the communication/call by the originating party. As an example, the decision operation 530 may be used to allow roaming calls to use the MNO 102 as a transit network while denying all other uses discussed above.

Figure 6:
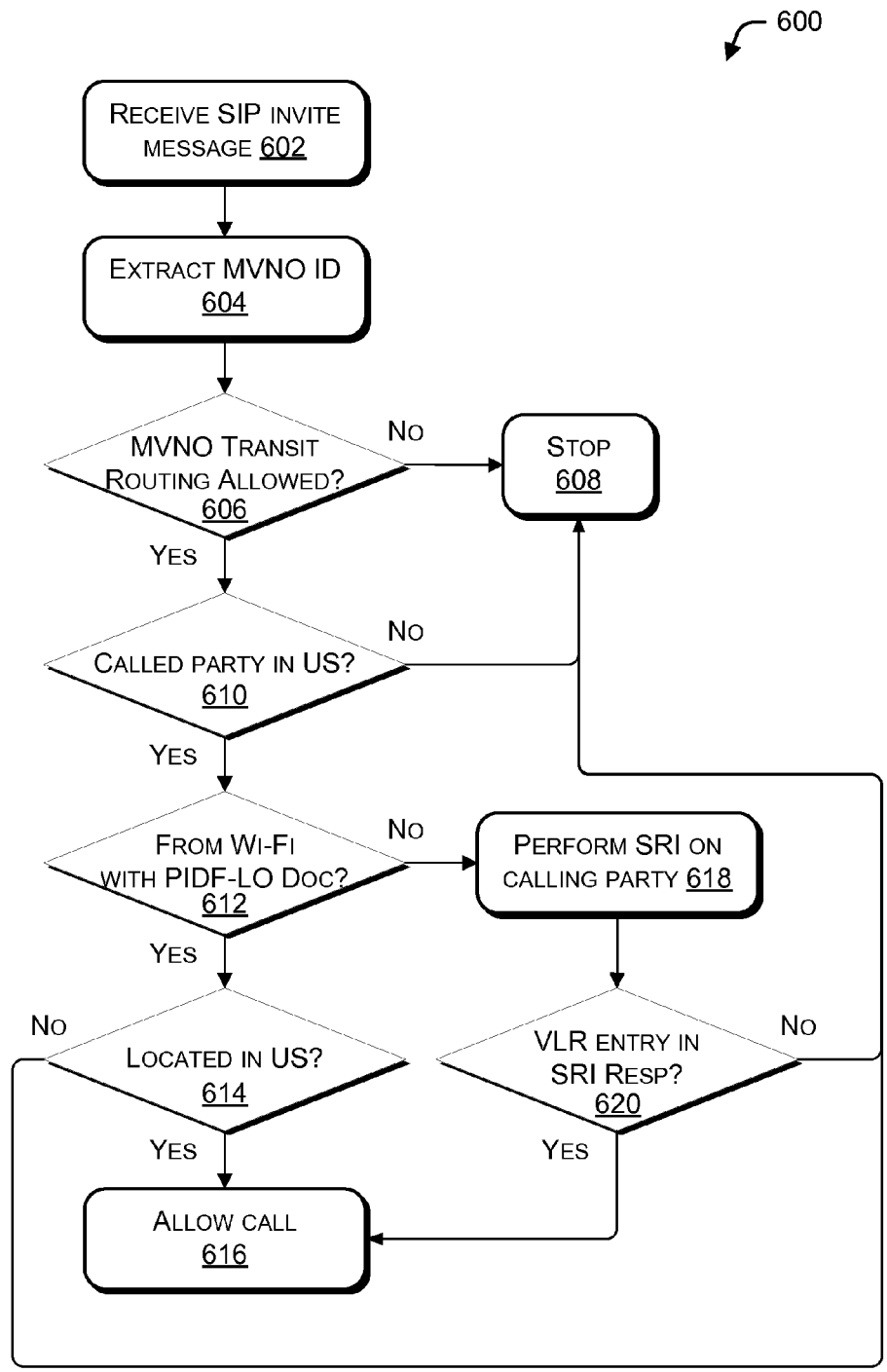
FIG. 6 illustrates another example process of routing traffic that uses a MNO as a transit network.

Although the process 500 shows use of all the conditions A-E in Table 1, more or fewer conditions may be used, as well as different conditions/rules. FIG. 6 shows one example where only some conditions are used, and thus the flow is customized. However, other variations are contemplated to enable allowing or denying use of the MNO network as a transit network by a MVNO.

FIG. 6 illustrates another example process 600 of routing traffic that uses a MNO as a transit network. The process 600 is described with reference to the environment 100 and may be performed by the transit gatekeeper 116 that employs the transit logic 206. Of course, the process 600 may be performed in other similar and/or different environments.

At 602, the transit gatekeeper 116 may receive the SIP invite message from the SBC 114 following the operation 408 discussed above. The SIP invite may include the MVNO ID.

At 604, the transit gatekeeper 116 may extract the MVNO ID. The transit gatekeeper 116 may access a table, such as Table 1, provided above, to lookup conditions/rules associated with the MVNO using the MVNO ID.

At 606, the transit gatekeeper 116 may determine, based at least in part on the MVNO ID, whether to allow any transit routing for the identified MVNO. For example, this condition may be based on Condition A shown in Table 1. When no transit routing is allowed (following the "no" route from the decision operation 606), then the process 600 may advance to an operation 608.

At 608, the MVNO may be denied access to the MNO network for use as a transit network. For example, the MNO may terminate transmission with the MVNO upon or after this determination. In some embodiments, the MNO may transmit a termination message.

When transit routing is allowed (following the "yes" route from the decision operation 606), then the process 600 may advance to a decision operation 610.

At 610, the transit gatekeeper 116 may determine, based at least in part on the MVNO ID, whether the destination party is located in the US (or another specified region). When the destination party is not located in the US (or another specified region) (following the "no" route from the decision operation 610), then the process 600 may advance to the operation 608 and terminate. When the destination party is located in the US (or another specified region) (following the "yes" route from the decision operation 610), then the process 600 may advance to an operation 612.

At 612, the transit gatekeeper 116 may determine, based at least in part on the MVNO ID, whether the originating party is connected using Wi-Fi (or another communications from unlicensed spectrums) and includes a Presence Information Data Format (PIDF) document, such as a PIDF-LO (that indicates a US state), etc.) or other locating information. When the originating party is connected using Wi-Fi (or another communication from unlicensed spectrums) and includes the PIDF document (or other locating information) (following the "yes" route from the decision operation 612), then the process 600 may advance to an operation 614.

At 614, the transit gatekeeper 116 may determine based at least in part on the PIDF document (or other locating document), whether the originating party is in the US (or other specified region). For example, the PIDF may indicate a latitude/longitude of the originating party, which may be used to determine whether the originating party is located in the US or another specified region. When the originating party is determined to be in the US (or other specified region) (following the "yes" route from the decision operation 614), then the process 600 may advance to an operation 616.

At 616, the transit gatekeeper 116 may allow the communication/call by the originating party.

When the originating party is not connected using Wi-Fi (or another form of communication using unlicensed spectrum) and/or does not include the PIDF document (or other locating information) (following the "no" route from the decision operation 612), then the process 600 may advance to an operation 618.

At 618, the transit gatekeeper 116 may perform a SRI request for the originating party (i.e., party using the respective user device 110) in order to obtain an SRI response.

At 620, the transit gatekeeper 116 may determine whether a VLR entry is included in the SRI response. This may indicate that the originating party is a legitimate roaming user and thus should be allowed to access the MNO network as a transit network. When the VLR entry is included in the SRI response (following the "yes" route from the decision operation 620), then the process 600 may advance to the operation 616 and allow the call/communication. When the VLR entry is not included in the SRI response (following the "no" route from the decision operation 620), then the process 600 may advance to the operation 608 and terminate.

Figure 7:
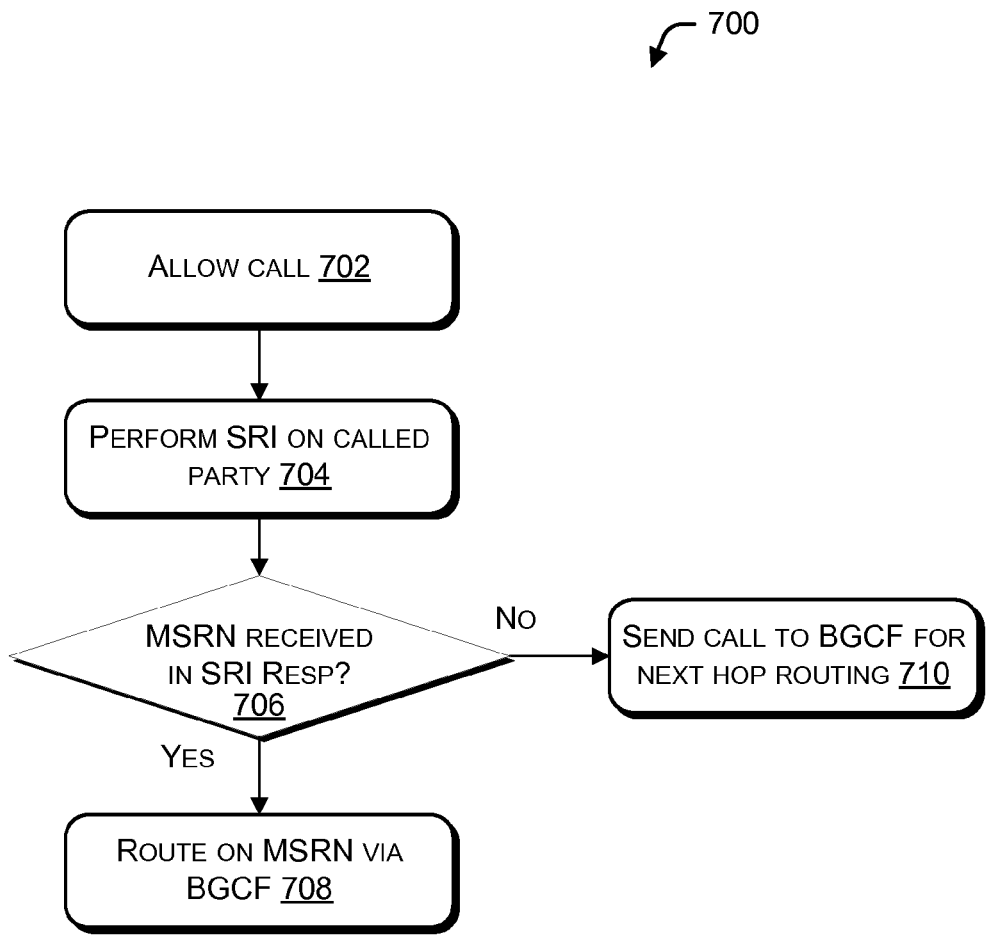
FIG. 7 illustrates an example process of routing an allowed communication.

FIG. 7 illustrates an example process 700 of routing an allowed communication. The process 700 is described with reference to the environment 100 and may be performed by the BGCF 122 via the BGCF interface 210. Of course, the process 700 may be performed in other similar and/or different environments.

At 702, the call/communication may be determined to be allowed (e.g., via the operation 516 or the operation 616 discussed above).

At 704, the transit gatekeeper 116 may perform an SRI on the destination party.

At 706, the transit gatekeeper 116 may receive a mobile subscriber roaming number (MSRN) in response to the request for the SRI from the operation 704. When the transit gatekeeper 116 receives the MSRN in response to the request for the SRI (following the "yes" route from the decision operation 706), then the process 700 may advance to an operation 708.

At 708, the transit gatekeeper 116 may route the call on the MSRN via the BGCF 122.

When the transit gatekeeper 116 does not receive the MSRN in response to the request for the SRI (following the "no" route from the decision operation 706), then the process 700 may advance to an operation 710.

At 710, the transit gatekeeper 116 may send the call to the BGCF 122 for the next hop routing.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method of routing traffic through a mobile network, the method comprising:
   receiving, by a session border controller (SBC) device a session initiation protocol (SIP) invite message;
   identifying, by the SBC device, a mobile virtual network operator (MVNO) from the SIP invite message;
   determining, by the SBC device, a MVNO identifier (ID) for the MVNO;

inserting, by the SBC device, the MVNO ID in a private header of the SIP invite message;

determining, by a transit gatekeeper device, whether the MVNO has permission to use the mobile network as a transit network though use of a lookup table, the lookup table associating the MVNO ID with a plurality of conditions associated with use of the mobile network by the MVNO and having been retrieved from a Home Location Register (HLR) that stores the lookup table;

in response to determining that the MVNO has permission to use the mobile network as the transit network, enforcing, by the transit gatekeeper device, at least one condition of the plurality of conditions, the at least one condition being associated with attributes of an originating party or a destination party in a communication serviced by the MVNO; and allowing, by the transit gatekeeper device, use of the mobile network in response to determining that the at least one condition is satisfied.

2. The method as recited in claim 1, wherein the MVNO is a Voice over Internet Protocol (VoIP) service that uses the transit network to connect VoIP communications.

3. The method as recited in claim 1, further comprising denying use of the mobile network in response to determining that the at least one condition is not satisfied.

4. The method as recited in claim 1, wherein the at least one condition is a call roaming exception, the call roaming exception to allow use of the mobile network in response to verification of a send routing information (SRI) request by the originating party.

5. The method as recited in claim 1, wherein the at least one condition is a determination that the communication is from an unlicensed spectrum that includes Wi-Fi.

6. The method as recited in claim 1, wherein the at least one condition causes denial of use of the mobile network when the destination party is located outside of a specified region and the communication is via Wi-Fi.

7. The method as recited in claim 1, wherein the at least one condition causes denial of use of the mobile network when the originating party is located outside of a specified region and the communication is via Wi-Fi.

8. The method as recited in claim 1, further comprising routing the communication through a Breakout Gateway Control Function (BGCF) to connect the originating party to the destination party.

9. One or more computer storage devices having stored thereon computer-executable instructions configured to program a transit gatekeeper device to perform operations comprising:

identifying a mobile virtual network operator (MVNO) from a session initiation protocol (SIP) invite message, wherein an identifier of the MVNO is included in a private header of the SIP invite message;

determining whether the MVNO has permission to use the mobile network as a transit network though use of a lookup table, the lookup table associating the MVNO with a plurality of conditions associated with use of the mobile network by the MVNO, and having been retrieved from a Home Location Register (HLR) that stores the lookup table;

enforcing at least one condition of the plurality of conditions in response to determining that the MVNO has permission to use the mobile network as the transit network; and allowing use of the mobile network in response to determining that the at least one condition is satisfied.

10. The one or more computer storage devices as recited in claim 9, wherein the at least one condition is associated with attributes of an originating party or a destination party in a communication serviced by the MVNO.

11. The one or more computer storage devices as recited in claim 9, wherein the MVNO is a Voice over Internet Protocol (VoIP) service that uses the transit network to connect VoIP communications.

12. The one or more computer storage devices as recited in claim 9, further comprising denying use of the mobile network in response to determining that the at least one condition is not satisfied.

13. The one or more computer storage devices as recited in claim 9, wherein the at least one condition is a call roaming exception.

14. The one or more computer storage devices as recited in claim 9, wherein the at least one condition is a determination that the communication is from an unlicensed spectrum.

15. The one or more computer storage devices as recited in claim 9, wherein the at least one condition causes at least one of:

denial of use of the mobile network when the destination party is located outside of a specified region and the communication is via Wi-Fi, or denial of use of the mobile network when the originating party is located outside of a specified region and the communication is via Wi-Fi.

16. The one or more computer storage devices as recited in claim 9, further comprising routing the communication through a Breakout Gateway Control Function (BGCF) to connect the originating party to the destination party.

17. A telecommunications system comprising:

A session border controller (SBC) to
receive a session initiation protocol (SIP) invite message;
identify a mobile virtual network operator (MVNO) from the SIP invite message; and
determine a MVNO identifier (ID) for the MVNO;
insert the MVNO ID in a private header of the SIP invite message; and a transit gatekeeper to:
determine whether the MVNO has permission to use the mobile network as a transit network based on the MVNO ID retrieved from the SIP invite message;
in response to determining that the MVNO has permission to use the mobile network as the transit network, enforcing at least one condition, the at least one condition being associated with attributes of an originating party or a destination party in a communication serviced by the MVNO; and
denying use of the mobile network in response to determining that the at least one condition is not satisfied.

18. The telecommunications system as recited in claim 17, further comprising a Home Location Register (HLR) that stores the at least one condition.

19. The telecommunications system as recited in claim 17, further comprising a Breakout Gateway Control Function (BGCF) to route communications that satisfy the at least one condition.

20. The telecommunications system as recited in claim 17, wherein the MVNO is a Voice over Internet Protocol (VoIP) service that uses the transit network to connect VoIP communications.

* * * * *